INVENTOR.
NORMAN F. DIEDERICH
BY Albert R. Golrick

| PANEL NO. 1 | | | | | PANEL NO. 2 | | | | | PANEL NO. 3 | | | | |
|---|---|---|---|---|---|---|---|---|---|---|---|---|---|---|
| POS. NO. | BACK-GROUND | 1 ST. LINE | 2 ND. LINE | 3 RD LINE | POS. NO. | BACK-GROUND | 1 ST LINE | 2 ND LINE | 3 RD LINE | POS. NO. | BACK-GROUND | 1 ST LINE | 2 ND LINE | 3 RD LINE |
| 1 | WHITE | — | — | — | 36 | YELLOW | BLUE | BLACK | — | 71 | WHITE | BROWN | BLACK | — |
| 2 | YELLOW | — | — | — | 37 | YELLOW | BLUE | BROWN | — | 72 | YELLOW | BROWN | BLACK | — |
| 3 | RED | — | — | — | 38 | YELLOW | BLUE | GREEN | — | 73 | YELLOW | BROWN | — | — |
| 4 | BLUE | — | — | — | 39 | YELLOW | BLUE | — | — | 74 | YELLOW | BROWN | BROWN | — |
| 5 | GREEN | — | — | — | 40 | YELLOW | BLUE | BLUE | — | 75 | YELLOW | BROWN | BROWN | BROWN |
| 6 | BROWN | — | — | — | 41 | YELLOW | BLUE | BLUE | BLUE | 76 | RED | BROWN | BLACK | — |
| 7 | BLACK | — | — | — | 42 | RED | BLUE | BLACK | — | 77 | RED | BROWN | — | — |
| 8 | WHITE | YELLOW | — | — | 43 | RED | BLUE | BROWN | — | 78 | RED | BROWN | BROWN | — |
| 9 | WHITE | YELLOW | YELLOW | — | 44 | RED | BLUE | GREEN | — | 79 | RED | BROWN | BROWN | BROWN |
| 10 | WHITE | YELLOW | YELLOW | YELLOW | 45 | RED | BLUE | — | — | 80 | BLUE | BROWN | BLACK | — |
| 11 | WHITE | YELLOW | BLACK | — | 46 | RED | BLUE | BLUE | — | 81 | BLUE | BROWN | — | — |
| 12 | WHITE | YELLOW | BROWN | — | 47 | RED | BLUE | BLUE | BLUE | 82 | BLUE | BROWN | BROWN | — |
| 13 | WHITE | YELLOW | GREEN | — | 48 | WHITE | GREEN | — | — | 83 | BLUE | BROWN | BROWN | BROWN |
| 14 | WHITE | YELLOW | BLUE | — | 49 | WHITE | GREEN | GREEN | — | 84 | GREEN | BROWN | BLACK | — |
| 15 | WHITE | YELLOW | RED | — | 50 | WHITE | GREEN | GREEN | GREEN | 85 | GREEN | BROWN | — | — |
| 16 | WHITE | RED | — | — | 51 | WHITE | GREEN | BLACK | — | 86 | GREEN | BROWN | BROWN | — |
| 17 | WHITE | RED | RED | — | 52 | WHITE | GREEN | BROWN | — | 87 | GREEN | BROWN | BROWN | BROWN |
| 18 | WHITE | RED | RED | RED | 53 | YELLOW | GREEN | BLACK | — | 88 | WHITE | BLACK | — | — |
| 19 | WHITE | RED | BLACK | — | 54 | YELLOW | GREEN | BROWN | — | 89 | WHITE | BLACK | BLACK | — |
| 20 | WHITE | RED | BROWN | — | 55 | YELLOW | GREEN | — | — | 90 | WHITE | BLACK | BLACK | BLACK |
| 21 | WHITE | RED | GREEN | — | 56 | YELLOW | GREEN | GREEN | — | 91 | YELLOW | BLACK | — | — |
| 22 | WHITE | RED | BLUE | — | 57 | YELLOW | GREEN | GREEN | GREEN | 92 | YELLOW | BLACK | BLACK | — |
| 23 | YELLOW | RED | BLACK | — | 58 | RED | GREEN | BLACK | — | 93 | YELLOW | BLACK | BLACK | BLACK |
| 24 | YELLOW | RED | BLACK | — | 59 | RED | GREEN | BROWN | — | 94 | RED | BLACK | — | — |
| 25 | YELLOW | RED | GREEN | — | 60 | RED | GREEN | — | — | 95 | RED | BLACK | BLACK | — |
| 26 | YELLOW | RED | BLUE | — | 61 | RED | GREEN | GREEN | — | 96 | RED | BLACK | BLACK | BLACK |
| 27 | YELLOW | RED | — | — | 62 | RED | GREEN | GREEN | GREEN | 97 | BLUE | BLACK | — | — |
| 28 | YELLOW | RED | RED | — | 63 | BLUE | GREEN | BLACK | — | 98 | BLUE | BLACK | BLACK | — |
| 29 | YELLOW | RED | RED | RED | 64 | BLUE | GREEN | BROWN | — | 99 | BLUE | BLACK | BLACK | BLACK |
| 30 | WHITE | BLUE | — | — | 65 | BLUE | GREEN | — | — | 100 | GREEN | BLACK | — | — |
| 31 | WHITE | BLUE | BLUE | — | 66 | BLUE | GREEN | GREEN | — | 101 | GREEN | BLACK | BLACK | — |
| 32 | WHITE | BLUE | BLUE | BLUE | 67 | BLUE | GREEN | GREEN | GREEN | 102 | GREEN | BLACK | BLACK | BLACK |
| 33 | WHITE | BLUE | BLACK | — | 68 | WHITE | BROWN | — | — | 103 | BROWN | BLACK | — | — |
| 34 | WHITE | BLUE | BROWN | — | 69 | WHITE | BROWN | BROWN | — | 104 | BROWN | BLACK | BLACK | — |
| 35 | WHITE | BLUE | GREEN | — | 70 | WHITE | BROWN | BROWN | BROWN | 105 | BROWN | BLACK | BLACK | BLACK |

98

Fig.2

INVENTOR.
NORMAN F. DIEDERICH
BY
Albert R. Golrick

Nov. 6, 1956

N. F. DIEDERICH

METHOD AND APPARATUS FOR FORMING ASSEMBLIES OF CODED MARKERS ON PANELS 2,769,480

Filed Aug. 25, 1953

4 Sheets-Sheet 3

INVENTOR.
NORMAN F. DIEDERICH
BY
Albert R. Golrick

INVENTOR.
NORMAN F. DIEDERICH
BY
Albert R. Golrick 2,769,480

METHOD AND APPARATUS FOR FORMING ASSEMBLIES OF CODED MARKERS ON PANELS

Norman Frank Diederich, Cleveland, Ohio

Application August 25, 1953, Serial No. 376,435

6 Claims. (Cl. 154—1.6)

This invention is directed to the provision of a system of identification for multi-electric wiring and other multi-conduit systems and the general object thereof is the provision of a duplex marking system, the efficiency of use of which is not dependent upon the memory of the workman.

More specifically, my invention is concerned with the provision of a color code which is conveniently applicable to electrical wiring systems wherein a plurality of wired circuits are present, the code being sufficiently comprehensive to be adaptable to wire identification without optical confusion in systems involving a large number of circuits.

Another object of the present invention is the provision of a coded tape system which will not conflict with established circuit or wire designating practices and whereby the necessity of carrying a variety of colors of wire stock is avoided.

A further object is the provision of an assembly of wire designating tape pieces arranged in pairs as to marking upon a common panel or carrier strip from which they can be removed conveniently; the designating tape pieces being adhesively backed whereby when one of a pair of identically colored or marked pieces is removed from a pack and taped to a wire end, the matching tape piece remains on the panel until removed by the workman and applied by him to the other end of the wire.

A further object of the present invention is the provision of a coding method for arranging marked tape pieces in pairs on a carrier panel with each pair being highly contrasty in appearance relative to the appearance of all other pairs of pieces of tape arranged on one panel or pack or arranged on several packs when the wiring circuits are extensive in number.

A still further object of this invention is the provision of mechanism for effecting the assembly of a plurality of pairs of distinctive appearing strips of adhesive tape upon a carrier panel or pack whereby the pairs of tape will remain in order of use during commercial handling and during industrial use of the panel or pack.

Other objects of my invention will become apparent from the following description of my method of forming a series of pairs of coded markers arranged on panels or in packs or decks and mechanism for producing the assemblies.

In the drawings,

Fig. 2 is a view of a code chart and which indicates the flexibility of the system of identification;

Figures 1, 6, 8, 9:
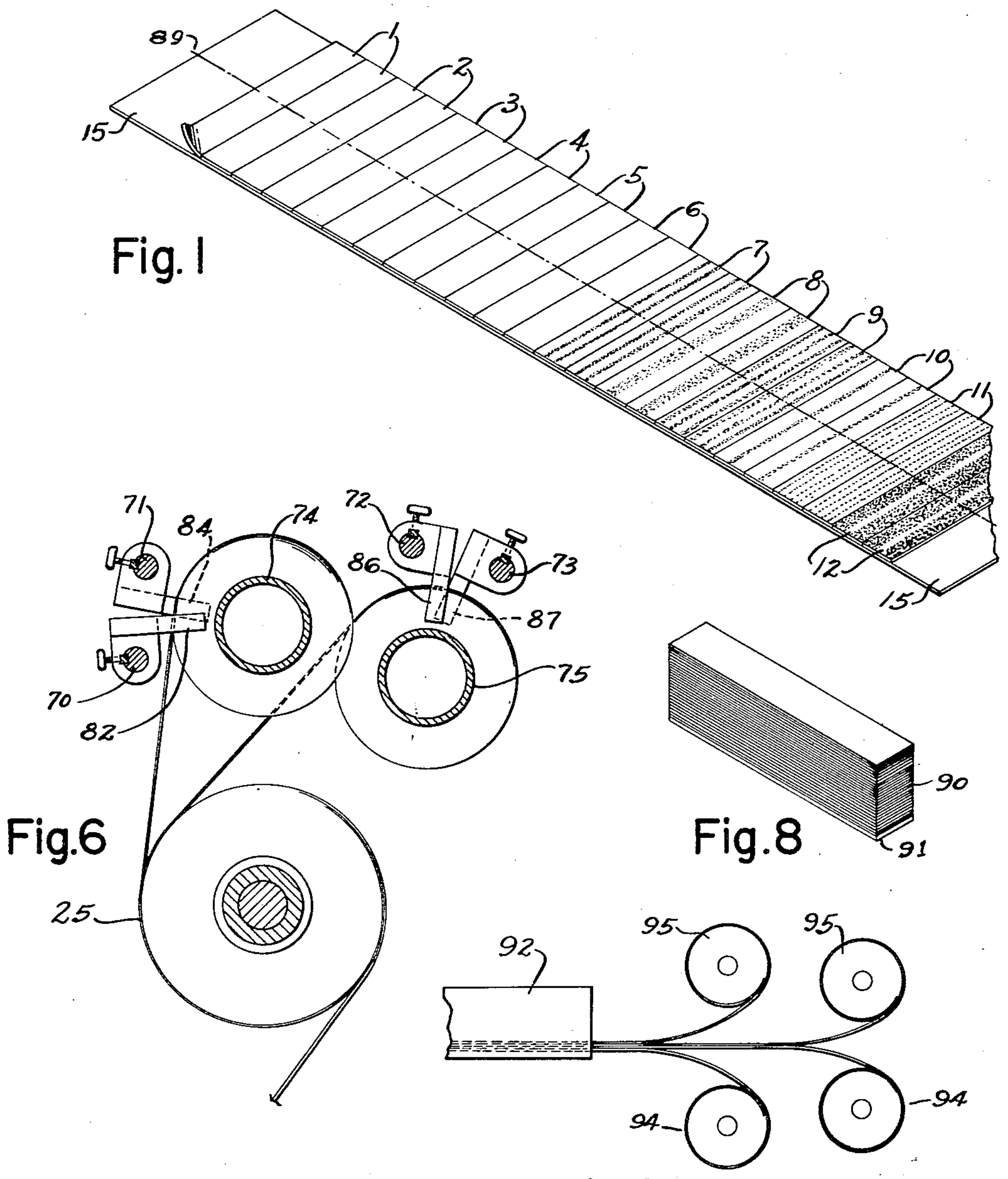
Fig. 1 is a plan view of a panel with a series of twelve pairs of wire marking tapes removably mounted on a carrier piece.
Fig. 6 is a cross sectional elevation taken along a plane indicated by the line 6—6 of Fig. 3.
Fig. 8 is a perspective view of a series of pairs of markers arranged in deck or pack fashion.
Fig. 9 is a diagrammatic view of apparatus for and method of effecting the assembly of the pairs of markers in decks or packs.
Figure 7:
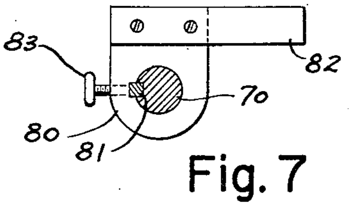
Fig. 7 is an enlarged view in cross section of the tape roll mounting and tape guiding means as used in the machine.
Figure 3:
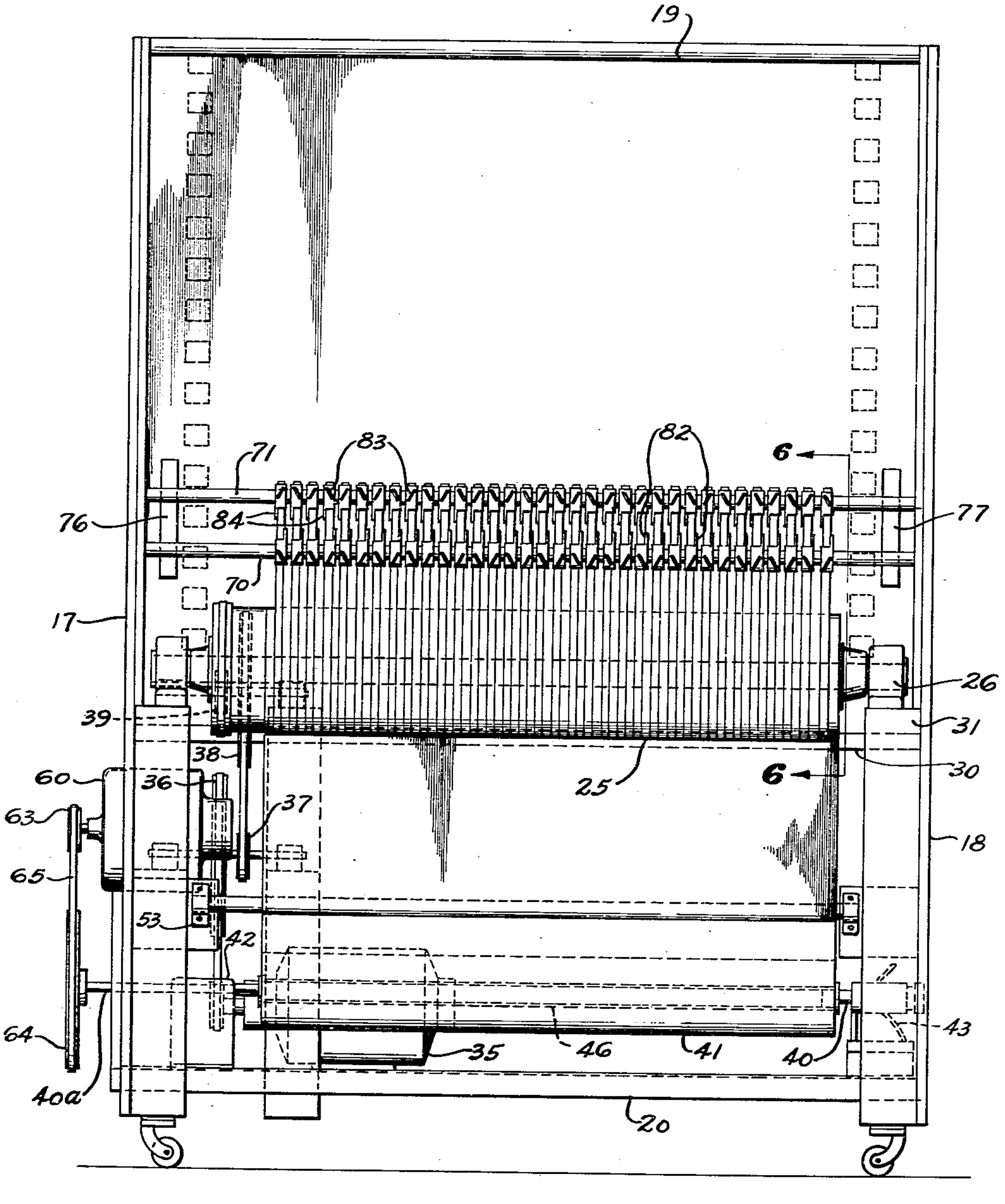
Fig. 3 shows a front elevation of a machine adapted to the production of panels of markers.

It has been the practice heretofore to identify the individual circuits of a wiring system by the use of wiring or cable of different insulating colors or by color strands woven into the braiding covering the insulation. In assembling a wiring harness involving a large number of circuits, the color variations available are exceeded and numbering the wire ends becomes necessary. Also, where two or more lengths of wire of the same color are used, it becomes necessary to bell test or flash test these wires. I have devised a system of wire identification which will permit the electrician to assemble a wiring harness and cable the common stretches in a compact manner by the use of adhesive tape markers used in pairs of common identity and which can be wrapped permanently upon the wire adjacent the terminal ends thereof for instant identity. To this end, I utilize a tape carrier preferably comprising a sized or vanished cambric to which are adhesively applied crosswise extending adjacently disposed pairs of tape strips. The strip of each pair is marked by being of the same background color as its mate or of the same background color and overlying color striping. In Fig. 1, I show pairs of tape strips numbered in pairs 1—1, 2—2, etc., the first six pairs having solid primary or base colors, the first pair being white and the sixth pair 6—6 being black, the intermediate pairs being blue, yellow, red and brown respectively. Thereafter, the succeeding pairs may be of any background color, but with contrasting colored striping arranged on the flexible cambric panel 15. In dimensions, I find that a panel assembly about one and three-eighths inches wide with the tape strips one-half inch wide affords a marker which can be dexterously removed by pulling the strip from its supporting cambric. Since the width of the panel determines the length of the marker strip, panels of the stated width will have strips of sufficient length to wrap about No. 10 to 14 wires, the insulated diameters of which are about one-quarter of an inch. This size of strip also is conducive to ready application thereof to the wire by compact coiling which effects permanent non-bulking attachment to the wire adjacent its terminal end in a neat manner. Thus, the harness assembler will mark one wire at a time using a pair of identical strips by removing the pairs in sequence from the fabric carrier and multi-wiring becomes simple since the ends of each wire are distinctly identifiable when the wiring is compacted into cable or multi-layer form.

Should only one end of a wire be marked and the workman is interrupted, the remaining mate strip on the panel is an instant reminder of the existence of an unmarked wire end and the workman can locate it immediately by instant identification of the matching marker on the other end of the wire.

Should the user strip only a part of a panel, he can continue the use of the remainder in the next assembly operation since the markings designate no more than the two ends of a single wire. Should it be desired to use wiring, for example, in red insulation for the primary or positive side of a circuit, then other than the red tape would be used on such circuits to mark them. Hence, insulation colors conforming with industrial standards can still be used with my system.

I find that cambric treated with a coating inert to the adhesive serves as an excellent carrier for the strips since it is pliable, is inert to the adhesive material and is sufficiently impervious to air to preserve the freshness of the adhesive. Panels thus made handle well and withstand abuse and can be packaged, stocked and shipped in a commercially economic manner. A deck or pack form of assembly of pairs of identical markers is shown in Fig. 8 and the manner of the forming thereof will hereinafter be described.

I have developed a method of assembling the adhesive strips in panel form upon the cambric in a continuous manner whereby a multitude of individual tape strips are rolled upon a continuous cambric sheet or blanket which is thereafter severed crosswise of the strips into panels of the desired width. The tape strips are commerically available and the individual markings are effected on the tape strips before the strips are applied to the cambric blanket.

The panel assembler comprising the machine shown in Figs. 3 to 7 of the drawings is adapted to receive a large number of rolls of marked tape arranged upon two separate mandrels or parallel axles and the adjacency of the tape rolls is interrupted by having alternate ribbons of tape come from rolls arranged on one axle and the strips intermediate to the first set are drawn from tape rolls arranged on the other axle intermediate the rolls of the first set. With such a mechanical arrangement, ribbon guiding means can be adjustably arranged in the machine to individually guide each ribbon of tape to the blanket or sheet of cambric in such manner that the edge of each ribbon of tape will lie in immediate adjacency or abutment to the edges of adjacent ribbons of tape. With such a means, the strips of tape, could, if desired, be applied to the cambric carrier in an overlapping relation thereby to assemble a greater number of marking strips on a single panel. However, in the machine as illustrated, the guiding means are set to produce an application of the tape ribbons to the backing or carrier sheet with the tape edges in immediate adjacency. Also, in the machine about to be described, a powered shearing mechanism extending transversely the width of the assembled blanket of tape is contemplated, but has not been disclosed, there being in lieu thereof, a cutting board and a gauged cutting rail is provided for cutting the assembled blanket of cambric and tape thereon into panels of any desired uniform width.

Figure 4:
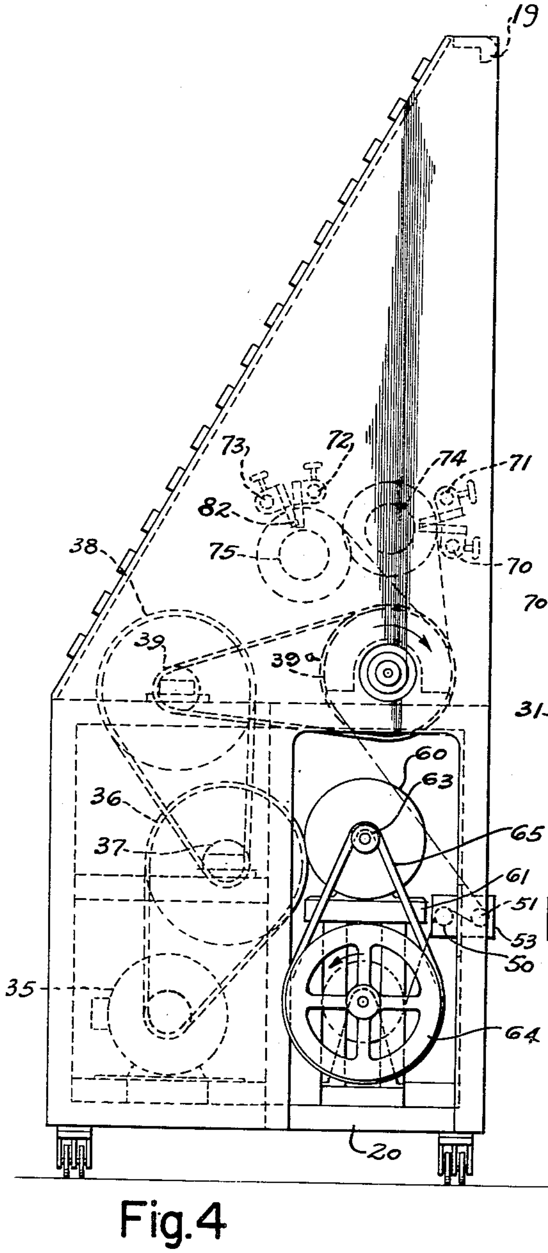
Fig. 4 is an end elevation of the machine as viewed from the left of Fig. 3.
Figure 5:
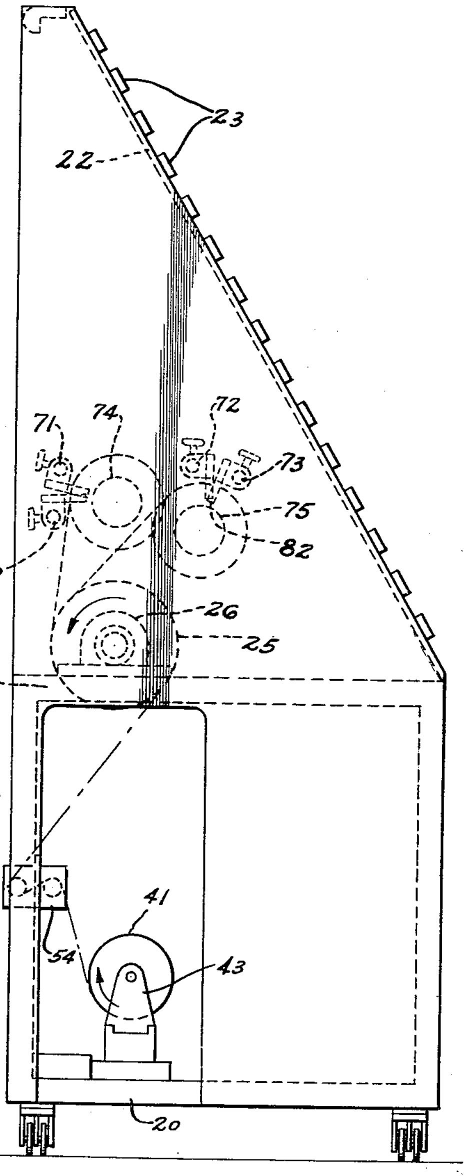
Fig. 5 is an end elevation of the machine as viewed from the right of Fig. 3.

In the drawings in Figs. 4 and 5, I show such a machine comprising a frame structure consisting of left and right side frame members 17 and 18 respectively connected at the top by a top rail 19 and at the bottom by a bottom panel 20. The upper parts of the side frame members slope from adjacent the top to the back to support a sloping cutting board 22 having adjustable equally spaced cutting gauge blocks 23 arranged at the sides thereof to support a knife guide which may be in the form of a flat steel straight edge rested on the blocks 23 as will be referred to later.

A winding drum 25 is located adjacent the open side of the machine frame and has bearing structures 26 suitably supported on side frame members 31 connected by a cross frame member 30. The winding drum 25 is belt driven from a motor 35 mounted upon the bottom panel structure 20 at the left side frame structure 17. A series of belt driving reduction pulleys 37—38 and 39—39*a* supported on stud shafts mounted on brackets suitably supported by the side frame structure 17 serve to reduce considerably the motor driven speed of the winding drum (note Figs. 3 and 4). An arbor or shaft 40 is provided in the lower region of the frame structure to support the roll of back up or tape carrying material, preferably cambric, which is available in roll form wound upon a cardboard tube 46. Thus, the shaft 40 may be in the form of two stub shafts carried by bearing brackets 42 and 43 and the right side stub shaft may be retractable in the bearing 43 for mounting of the fabric carrying tube 46.

A pair of relatively small diametered wrinkle removing rolls 50—51 are located intermediate the winding drum 25 and the fabric roll 41 and are suitably supported by bracket structures 53 and 54 secured to the side frame structures 17 and 18 respectively. The fabric from the roll 41 is passed upwardly about the rolls 50—51 and to the winding drum 25 as indicated by the dot and dash arrowed lines in Fig. 4.

I have found it desirable to provide some control over the unwinding action exerted on the roll of fabric 41 by the winding drum 25 when driven by motor 35 in order that a good de-wrinkling action may be obtained with the rollers 50—51. To this end, I provide a variable speed motor 60 supported by a bracket 61 on the side frame structure for controlling the unwinding action of the roll of fabric 41. The motor 60 is belt connected to an outward extension 40*a* of shaft 40 by speed reduction pulley 63 and 64 connected by belt 65. If desired, however, an adjustable, friction brake mechanism could be used on one of the stub shafts for the same purpose. However, I prefer to use a reversible motor which can be used in stall tension as a generator when the machine is stopped and can be used to vary the tension on the blanket as desired or to maintain the blanket tension constant as the diameter of the blanket roll decreases.

The mechanism so far described is concerned with the passage of the back up or carrier fabric to be used. I have provided, at a conveniently accessible position above the winding drum, four sets of mountings on the side frame structures 17 and 18 to support two pairs of transversely extending bars 70—71 and 72—73 disposed parallel to each other and to the drum axis. The bars 70—71 are non-rotatively located immediately adjacent a tape roll supporting arbor 74 and the bars 72—73 are supported in like manner relative to a second tape roll supporting arbor 75. The two arbors or mandrels 74 and 75 are removably supported on bearing block structures 76 and 77 respectively supported by the side frame structures 17 and 18.

The bars 70—71 and 72—73 support slidable blocks 80 which are keyed against rotative movement by key members 81. Each block serves as a support for flat tape guiding fingers secured to the blocks to extend substantially radially toward the centers of the tape roll supporting mandrels; as for example, the fingers 82 on the bar 70 will guide the right hand margin of the tape from the individual rolls while the fingers 84 on the bar 71 will guide the left hand margin of the tape. Wing screws 83 serve to lock each block in adjusted position. By arranging the tape guiding fingers in two sets and by having two tape roll carrying mandrels, I am able to have space for the multiple tape guiding means whereby the tape reaches from a multiplicity of rolls can be guided with the side margins thereof into close proximity and parallelism before the adhesive backs of the tape reach the back-up fabric on the drum. The net result is that I can wind a number of tape reaches onto the drum in overlapping or in marginal abutting relation as desired, the disposition of each one of like tape rolls being alternate on the two mandrels. In this arrangement, every other tape reach comes from rolls on the same mandrel, thus providing transverse adjusting space for the guide fingers of each tape which will be independent of the adjustment of the guide fingers for adjacent tapes. Hence, the fingers 86 and 87 adjustably mounted on the bars 72—73 are arranged in substantially the same manner as the fingers 82—84 on the bars 70—71, the guiding influence of the fingers being at transversely opposite points on the tape margins or edges.

The color and colored striping order of the tape rolls on the mandrels 74—75 is determined by having one of each sequentially positioned on the mandrels 74—75 and the number one tape roll on the mandrel 74 has its mating roll mounted on mandrel 75, but transversely displaced relative to its mate on the other mandrel a distance equal to the width of the tape rolls.

In operation, a roll of suitable back-up material is mounted upon the stub shafts 40—42 and the web of fabric therefrom is threaded upwardly through rolls 50—51 to the winding drum 25 and the web end may be attached to the drum by the use of tacks, clamps or of adhesive tape. The drum may then be turned a part of a revolution to advance the secured end beyond the line of tangency from the tape rolls to the drum perimeter. The tape reach from each roll is then threaded through its guiding fingers and the free end manually pressed upon the back-up fabric on the drum. The roll is then power turned while tape flow is inspected and any required adjustment of the fingers is then made. The machine is then power driven until the tape rolls are depleted.

By severing the back-up fabric web from the assembled tape and back-up material, it is then possible to pass the assembled sheets of materials upwardly over the cross bar 19 of the machine frame and then downwardly onto the sloping cutting board 22. The assembled web of materials is then cut with a suitable knife along a straight edge manually placed on the adjustable gauge blocks 23. When it is desired to form perforations through the middle of each panel, the straight edge is set on intermediate gauge blocks and a stitch wheel is used by pressing the same into the tape assembly as the wheel is drawn along the straight edge.

It will be seen that the length of the panels of pairs of tape markers is limited only by the width of the machine and that a roll of tape supporting material forty inches wide can receive and support forty pairs of marking tapes one-half inch wide. Since my code system affords one hundred and five distinct wire identities, it will be seen that the width of the machine is limited only by the width of blanket material commercially available. Should it be desired to produce, for example, panels carrying only ten different pairs of tape strips, the order of color and colored marking assembly could be repeated on the mandrels, thus producing two commercial panels per each transverse cut of the assembled web.

In the deck or pack article form of my invention as shown in Fig. 8, the pairs of identical strips 90 are sequentially stacked in adhering relation to each other on a base member 91 from which the last or bottom strip can be peeled. The method of assembly comprises the use of an aligning trough structure into which the tape is drawn from pairs of matched rolls 94, 95, etc. The assembled reach of stacked tape is then severed in any suitable manner into the desired marker strip length thus producing decks or stacks of pairs of wire marker strips which can be peeled from the deck one at a time.

The code chart 98 shown in Fig. 2 illustrates in part the extent of permutation of base color and stripe color which can be carried out on tape wire markers not more than one-half inch wide and constitutes an aid to the tape printer in printing over one hundred different combinations of base color and stripe color. It is apparent the printing can be carried out to the extent mentioned without resulting optical confusion and while not exceeding two colors per marker. It is to be understood that printing inks will be used which will not carry solvents for the adhesive coating on the opposite face of the tape. Also, the ink should be of a fast color permanent setting selection since the markings ultimately effected on the wires is to be of a durable permanent character. While three stripes on six base colors would produce another series of distinguishable markers, and even further series are obtainable by producing wavy stripes in different color combinations, and also by having printed pairs of stripes, each one being different in color with respect to the other and to the base color, the more economical system is to have the stripes on each marker of the same color, but in contrast to the base color, since only one printing step is involved. I find that a panel or deck of pairs of adhesively assembled markers to the extent of thirty-five pairs thereof per assembly affords the most convenient size for the workman to strip and handle conveniently. Hence, if a system involving or requiring the use of a hundred distinct markers is being worked upon, it would require the use of three panels or decks of pairs of markers each pair being distinct in appearance from the others in the other two panels or decks.

It will be seen that the inventions hereinbefore disclosed not only provide a novel system of wire marking identification which is practically mistake proof, but the means for fulfilling the method may comprise panels or packs of pairs of tape strips, each pair being of common identity which will preserve the utility of the tape throughout the channels of commerce and in the environment of their use. Such panels or decks can be produced in an economical manner by the use of my novel apparatuses and be of such size as to be most conveniently handled by the workman.

Should it be desired to produce a perforated panel as indicated by the dash lines 89 in Fig. 1, each pair of identical markers would come from a single roll, but the tape rolls would be arranged on the arbors in the alternating manner described and the panels would be cut to twice the width of the panel hereinbefore described. The user thus tears the cross-strip when removing from the panel to produce two identical strips.

I claim:

1. The method of forming an article of manufacture comprising a panel of wire identifying tape consisting of arranging series of rolls of adhesive tape having non-adhesively coated surfaces of different appearances in pairs of common appearance, applying in a simultaneous and continuous manner the strips of tape to a supporting membrane in marginal abutment with the distinctive appearing surfaces thereof exposed and in pairs of common appearance and severing the assembled strips and membrane transversely of the direction of extension of the strip edges thereby to produce panels of pairs of strips, each pair being distinctive from all other pairs of assembled strips.

2. In an apparatus for winding adhesively coated tape upon a web of supporting material, the combination of a machine frame, a power driven winding drum rotatively supported on the frame, a web roll supporting means on the frame, a plurality of tape roll supporting means on the frame, said winding drum being operatively disposed between the tape roll supporting means and the web roll supporting means and a set of adjustable tape guiding means operatively disposed adjacent each tape roll supporting means for individually guiding tape extending from tape rolls on said tape roll supporting means to an abutting wound relationship on the web material being wound on the drum.

3. In an apparatus for winding adhesively coated tape upon a web of supporting material, the combination of a machine frame, a winding drum rotatively supported on the frame, a web roll supporting means on the frame, a tape roll supporting means on the frame adapted to support a plurality of rolls of tape, said winding drum being operatively disposed between the tape roll supporting means and the web roll supporting means and adjustable tape guiding means operatively disposed adjacent the tape roll supporting means for individually guiding tape extending from tape rolls on said tape roll supporting means to an abutting wound relationship on the web material being wound on the drum.

4. In an apparatus for winding adhesively coated tape upon a web of supporting material, the combination of a machine frame, a power driven winding drum rotatively supported on the frame, a web roll supporting means on the frame, means associated with the web roll supporting means for controlling the web movement, a tape roll supporting means on the frame adapted to support a plurality of individual rolls of tape, said winding drum being operatively disposed between the tape roll supporting means and the web roll supporting means and individually adjustable tape guiding means supported on the frame for each tape roll on the tape roll supporting means for guiding tape extending from the tape rolls on said tape roll supporting means to an abutting wound relationship on the web material being wound on the drum.

5. In an apparatus for winding adhesively coated tape upon a web of supporting material, the combination of a machine frame, a power driven winding drum rotatively supported on the frame, a web roll supporting means on the frame, a plurality of tape roll supporting means on the frame, said winding drum being operatively disposed between the tape roll supporting means and the web roll supporting means and tape guiding fingers individually adjustably disposed adjacent the tape side margins for guiding the tape strips extending from tape rolls on said tape roll supporting means to an abutting wound relationship on the web material being wound on the drum.

6. In an apparatus of the character described, the combination of a machine frame, a tape and web winding drum, two tape roll supporting mandrels extending parallel to the axis of the winding drum for supporting two sets of alternately spaced rolls thereon and two sets of adjustable tape guiding fingers arranged adjacent each tape side margin for guiding the individual tape from the tape rolls on the two mandrels to the winding drum in edge abutting relation.

References Cited in the file of this patent

UNITED STATES PATENTS

| | | |
|---|---|---|
| 1,830,411 | Schork | Nov. 3, 1931 |
| 2,095,437 | Fox | Oct. 12, 1937 |
| 2,120,120 | Wells | June 7, 1938 |
| 2,391,539 | Avery | Dec. 25, 1945 |
| 2,541,444 | Storey et al. | Feb. 13, 1951 |
| 2,610,934 | Steele | Sept. 16, 1952 |
| 2,636,297 | Johnson | Apr. 28, 1953 |
| 2,679,928 | Bishop et al. | June 1, 1954 |

OTHER REFERENCES

Electrical Review, "Cable Markers," October 28, 1951, page 78.